United States Patent [19]

Markusson

[11] Patent Number: 5,117,713
[45] Date of Patent: Jun. 2, 1992

[54] ARRANGEMENT IN AUTOMATIC SAW CHAIN GRINDERS

[76] Inventor: Mikael P. Markusson, Villavagen 5 B, S-762 00 Rimbo, Sweden

[21] Appl. No.: 554,673

Related U.S. Application Data

[63] Continuation of PCT/SE88/00250 filed May 18, 1988

[22] Filed: Jun. 26, 1990
[51] Int. Cl.$^5$ .............................................. B23D 63/16
[52] U.S. Cl. ............................................ 76/40; 76/77; 76/80.5
[58] Field of Search .................. 76/37, 40, 41, 42, 43, 76/75, 77, 80.5

[56] References Cited

U.S. PATENT DOCUMENTS

| | | | |
|---|---|---|---|
| 3,592,085 | 7/1971 | Arnson | 76/42 |
| 4,287,793 | 9/1981 | Silvey | 76/42 |
| 4,416,169 | 11/1983 | Silvey | 76/37 |
| 4,643,050 | 2/1987 | Silvey | 76/42 |

*Primary Examiner*—Roscoe V. Parker
*Attorney, Agent, or Firm*—Ladas & Parry

[57] ABSTRACT

An arrangement in automatic saw chain grinders of the kind which includes a mechanism (30, 47) for feeding the cutter links (36) of a saw chain (22) to be ground to a predetermined grinding location on a chain support (14), and also a movable grinding machine (18, 19) for grinding the cutting edge (53) of a cutter link (36) present in the grinding location. The grinding location is defined by a chain feed and/or stop finger (46) against which the rear edge (40) of the cutter link (36) abuts in the grinding location. The feed mechanism (30, 47) includes a rotating or indexing saw-chain drive which is driven by an electric motor (32). For the purpose of eliminating the risk of cutting edges being ground wrongly or of the grinding process being interrupted because of irregularities in the link sequence of the saw chain (22), the finger (46) has mounted thereon a detecting device (44) for distinguishing between cutter links of right-hand and left-hand configurations and for checking that a cutter link in the grinding location is not displaced therefrom during the course of a grinding operation.

6 Claims, 4 Drawing Sheets

ARRANGEMENT IN AUTOMATIC SAW CHAIN GRINDERS

This application is a continuation of PCT/SE88/00250 filed May 18, 1988.

TECHNICAL FIELD

The present invention relates to an arrangement in an automatic saw chain grinder intended for grinding the chains of motor saws and like saw chains.

More specifically, although not exclusively, the invention relates to an automatic saw chain grinder of the kind which includes a chain support and means for automatically guiding and successively advancing a row of saw-chain cutter links to a pre-determined grinding location on the chain support, and a grinding machine which is movable relative to the chain support and which is guided automatically for grinding the cutting edge of a cutter link present in the grinding location, said grinding location being defined by an indexing and/or stop finger which can be moved between an active and an inactive position while sensing the contours of the chain links and against which the trailing or rear edge of a cutter link present in the grinding location may rest; and said indexing means including an electric drive motor and a rotating or indexing saw chain drive mechanism which is driven by said motor.

BACKGROUND PRIOR ART

A common feature of all saw chains used in present day motor saws and like forest clearing machines is that they comprise various types of links. Those links which need to be sharpened or ground are referred to as cutter links and are found in two mutually different configurations, namely right hand and left hand link configurations. In order to achieve an optimum cutting ability or effect, the toothed cutters of these cutter links must be ground with the setting of the grinding machine adjusted to the type of link to be ground. Seated forwardly of the cutting tooth of both link configurations is an extra tooth or depth gauge. Although it is sometimes necessary to adjust the length of this extra tooth, it is not normally ground at the same time as the cutting teeth, and neither should it be confused with a cutting tooth by the sensing or detecting devices of automatic saw chain grinders. The cutter links of a saw chain are normally separated by a spacing link or drive link, such that each alternate cutter link is a right hand link and each other cutter link is a left hand link. The majority of automatic saw chain grinders are constructed to grind each alternate cutter link, e.g. the right hand links, with the grinding wheel in a first setting, and then to grind the intermediate links, i.e. the left hand links, with the grinding wheel in a second setting. However, when joining together the ends of saw chains, e.g. after having adjusted the lengths thereof, it is very usual to use two identical cutter link configurations, i.e. links of the same kind, side by side, which causes problems when grinding such chains in automatic grinders. Exceptions are to be found in which forward feeding of the chain is monitored by some form of detector means or the other which when detecting the presence of two mutually sequential cutter teeth of the same kind will cause the machine to stop and therewith enable the machinist to move the irregularly placed cutter links manually past the grinding location. In this case the grinder cannot be said to be fully automatic.

In the case of automatic saw chain grinders, the saw chain normally passes over a chain support which includes horizontally extending support or guide plates which are delimited in the direction of the longitudinal axes by support wheels from which the chain hangs in a loop and is passed around a drive or support wheel, intended for tensioning the chain. The drive wheels may be driven by an electric motor over a friction clutch, and the motor may be controlled by a programmed mechanism to advance the saw chain through a distance corresponding substantially to the distance between two cutter links which face in mutually the same direction, and then to move the chain in reverse until a cutter link to be ground is positioned in a grinding location, defined by a stop means, whereafter the link is locked securely for grinding purposes. In other known kinds of automatic saw chain grinders, the saw chain is advanced through the agency of a plate which is driven by a camming plate and which imparts a reciprocating movement to the chain support, wherewith a feed finger arranged on the plate grips and feeds an appropriate chain link to a grinding location, where the link is located firmly for grinding purposes.

Both of the aforedescribed saw-chain feeding methods have the earlier mentioned drawback of not being devised for differentiating between right hand and left hand links. Furthermore, the programmed mechanisms are normally programmed to accommodate and grind links of the longest length that can possibly occur, which extends the length of the chain feed movements unnecessarily. Another drawback with known saw chain grinders is that they lack means which will ascertain that the cutter link remains constantly in position for grinding during the grinding process. Those detecting devices provided on certain types of known grinding machines for checking that the cutter link is located in the correct grinding position must be swung to one side during the grinding process, so as not to be damaged by the grinding wheel.

SUMMARY OF THE INVENTION

The object of the present invention is to eliminate the above mentioned drawbacks manifest in known chain saw grinders and to provide an arrangement which will ascertain automatically whether cutter links to be ground have a right hand or a left hand configuration. A further object is to provide an arrangement which will ascertain continuously that a cutter link concerned in a grinding process is located in said grinding location or position during the grinding process and which will interrupt the grinding process if the cutter link is moved out of position.

These and other objects are achieved with the arrangement according to the present invention, which includes at least one saw chain feed and/or stop finger which has arranged thereon at least one detecting device which is intended to detect when a cutter link to be ground and the finger pass one another during advancement of the saw chain, and therewith to activate the control and feed devices in a manner to bring the cutter link to its cutting position.

BRIEF DESCRIPTION OF THE DRAWINGS

The invention will now be described with reference to the accompanying drawings, in which.

DESCRIPTION OF PREFERRED EMBODYMENTS

Figure 1:
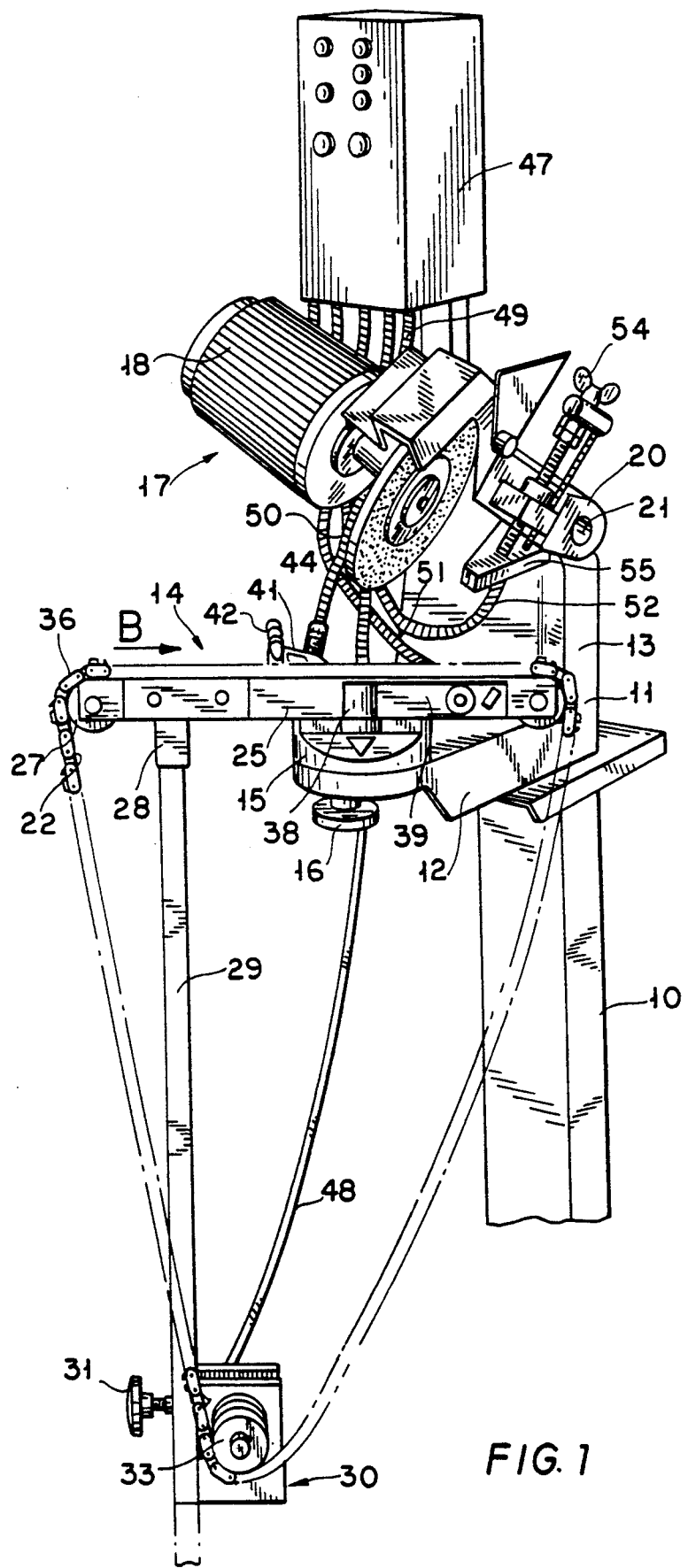
FIG. 1 is a perspective view of an exemplifying embodiment of an inventive automatic saw chain grinder.

The saw chain grinder illustrated in FIG. 1 includes a frame or stand 11 which is carried on a pillar 10 and which comprises a generally horizontal base part 12 and an essentially vertical back-piece 13 which extends upwards from the rear end of the base part.

The base part 12 is intended to carry a chain support, generally referenced 14, which is pivotally journalled in the forward part of the base plate 12 with the aid of a swing plate 15 which can be swung about a vertical axis and locked in a desired position of rotation with the aid of a locking screw 16. The back-piece 13 forms a carrier for a grinding machine, generally referenced 17, which comprises an electric motor 18 having an output shaft which carries a grinding wheel 19 and a holder 20, by means of which the motor 18 and the grinding wheel 19 are together pivotably journalled to the back-piece 13 of the frame 11, so as to be rotatable relative to said back-piece about a sloping axle 21.

The chain support 14 has the form of a horizontal support and guide element for cooperation with a saw chain 22 to be ground and comprises a rear guide rail 23 which is firmly attached to a rearwardly lying carrier rail 24, and a front guide rail 25. The two guide rails 23 and 25 define therebetween an elongated guide channel 26 and carry at each end of the channel a respective freely rotatable support wheel 27. Arranged at a short distance from the left end of the chain support, as seen in the drawings, is a holder 28 for a vertical bar 29 which carries a saw chain drive means, generally referenced 30. The drive means can be moved along the bar 29 and locked in a desired position therealong, with the aid of a locking screw 31.

Figure 7:
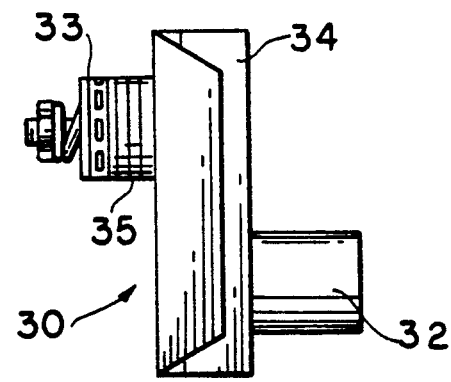
FIG. 7 is a side view of a saw chain drive means.

As illustrated schematically in FIG. 7, the drive means 30 includes an electric motor 32 and a chain drive wheel 33, which is driven from the motor 32 via a gear wheel 34 and a friction clutch 35.

The aforesaid chain support 14 of the illustrated embodiment enables the saw chain 22 extending over the drive wheel 33 and the two support wheels 27 to move rectilinearly in a horizontal path between the support wheels while supported by and guided laterally on the two guide rails 23 and 25.

In order to enable a chain-saw cutter link 36 to be clamped securely in a pre-determined grinding position along the aforesaid horizontal movement path formed by the guide rails 23 and 25, there is provided a clamping device in the form of an eccentric cam 38 which is pivotally journalled on a vertical shaft 37 and which is provided with an outwardly projecting arm 39. The eccentric cam 38 can be brought to bear against the front guide rail 25, with the aid of the arm 39, so as to urge said rail resiliently towards the rear guide rail 23.

The aforementioned grinding location for the illustrated cutter link 36 is determined by a finger with which the trailing edge 40 of the cutter link can be brought into abutment. The finger may have a chain stopping or chain indexing function and is formed by the outer, free end part 46 of a pivotal arm 41, the other end of which is pivotally mounted on a horizontal pivot pin 42 which extends above the two guide rails 23 and 25 in a direction perpendicular thereto and which is carried by a holder 43 attached to the carrier rail 24.

Figure 6:
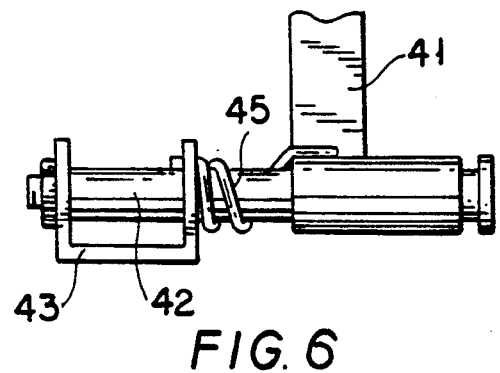
FIG. 6 is a view, taken from above and illustrating the pivotal arm journalling means.

The pivotal arm 41 has mounted thereon a microswitch 44, which forms a detecting device for co-action with the trailing or rear edge 40 of the cutter link 36. As shown in FIG. 6, the arm 41 is biassed by a spring 45 which strives to force the outer end part 46 of the arm into abutment with the upper side of the saw chain 22.

Figure 2:
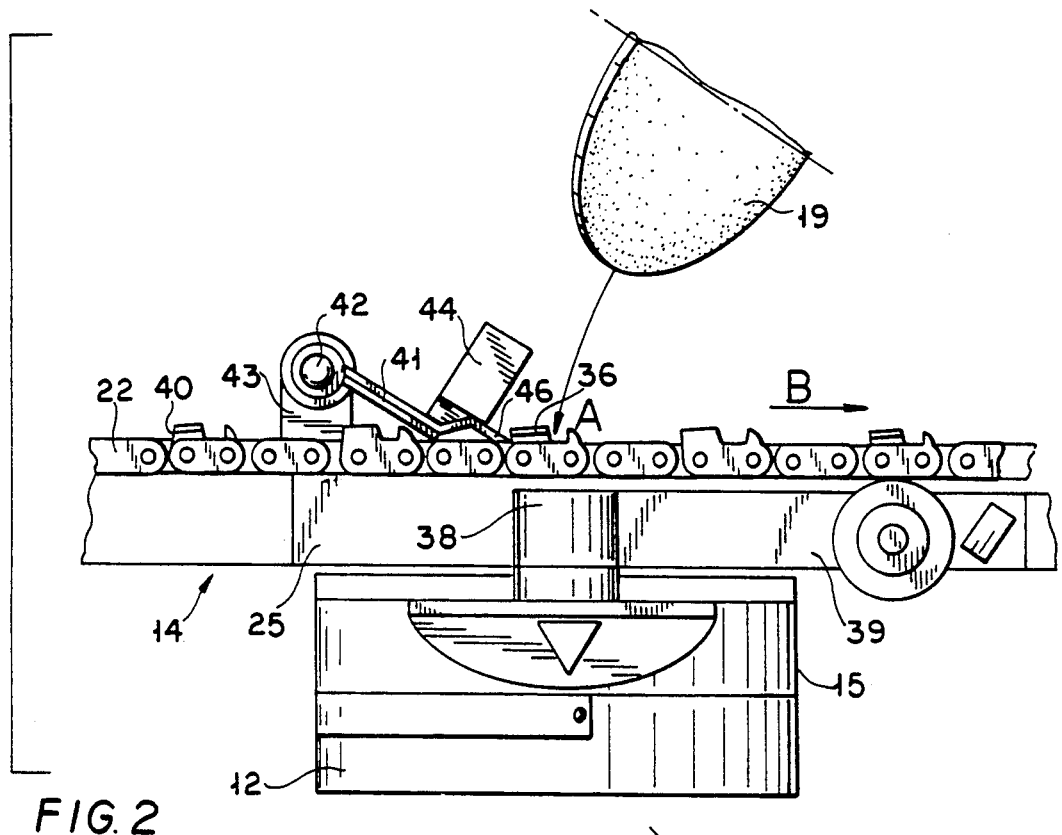
FIGS. 2 and 3 are part views, in larger scale, which illustrate a saw chain support in two mutually different positional settings in which the support permits grinding of one or the other of two rows of cutter links located on respective opposite sides of the saw chain.
Figure 3:
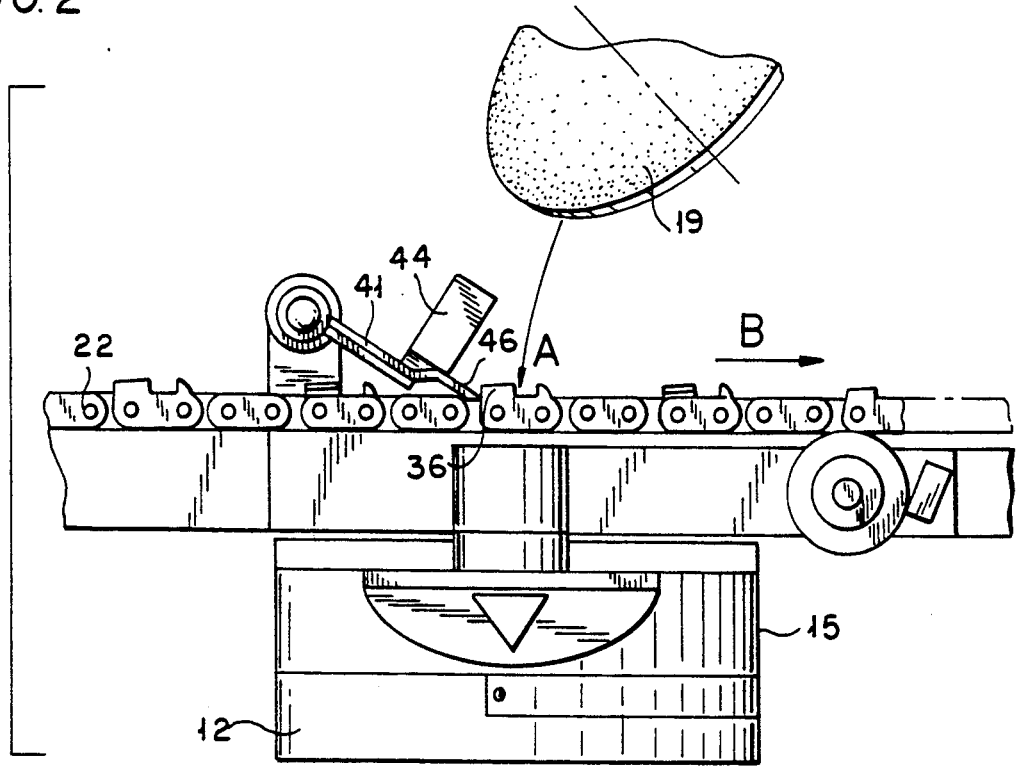
Figure 4:
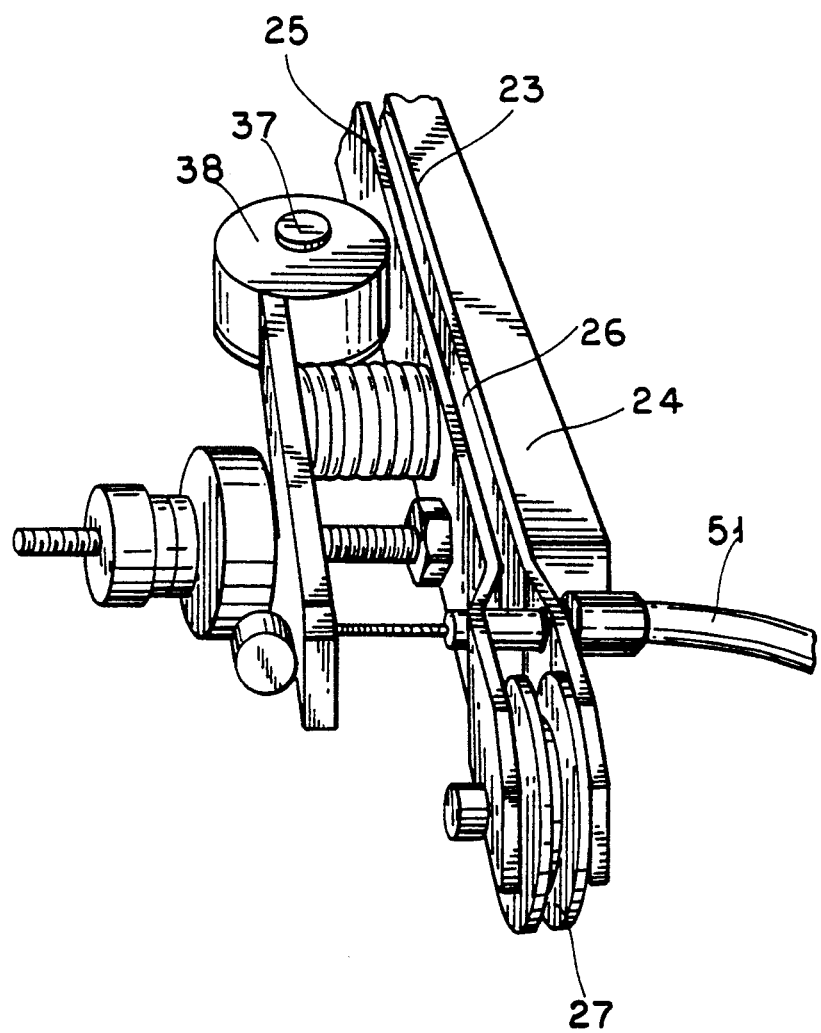
FIG. 4 is a part view in perspective which illustrates part of the chain support shown in FIG. 1, seen obliquely from above.

The illustrated grinder is intended to operate automatically, under the control of an electric control unit 47. This unit has connected thereto an electric power supply line 48 for the motor 32, an electric power supply line 49 for the motor 18, and an electric signal line 50 from the microswitch 44. Also connected tot eh unit 47 is a Bowden-cable 51 for manipulating the arm 39 on the eccentric cam 38 and a Bowden-cable 52 for manipulating the grinding machine holder 20. The grinding wheel 19 can be swung, with the aid of the cable 52 and in the manner indicated with an arrow in FIGS. 2 and 3, between the illustrated rest position and a position in which it can enagge a chain cutter link 36 positioned on the chain support 14 in the grinding location, such as to grind the cutting edge 53 of said link. The sesired grinding depth can be set manually with the aid of a setting screw 54, which cooperates with a fixed stop abutment 55.

In order to simplify the construction of the grinder, the grinder is configured so that grinding of the saw chain 22 must be effected in two stages, namely a first stage in which all cutter links 36 on one side of the chain 22 are ground, with grinding of the links being controlled automatically by the control unit 47, and a second stage in which all cutter links on the other side of the chain are ground automatically. Between these grinding stages it is necessary to manually adjust the setting of the chain support 14, by rotating the support about its vertical carrier axle, and also to manually adjust the setting of the pivotal arm 41. This adjustment to the setting of the arm 41 involves moving the arm laterally through a short distance on the pivot pin 42, so as to move the microswitch 44, which serves as a detecting device, from a position in which it detects the trailing or rear edges of the chain cutter links on one side of the chain to a position in which it detects the trailing or rear edges of the cutter links on the other side of the chain.

The automatic control of the grinding process achieved with the aid of the control unit 47 is described briefly herebelow.

Subsequent to resting the saw chain 22 to be ground on the chain support 14, in the manner illustrated in FIG. 1, with the chain drive links in engagement with the drive wheel 33, the chain support 14, the pivotal arm 41 and the setting screw 54 are adjusted to their respective required settings, together with any other adjustable elements of the grinder which need to be set positionally.

The grinding process is then commenced. This is effected by starting up the 32, so as to advance the saw chain 22 in a direction corresponding to its normal working direction. This direction is referenced B in FIGS. 1, 2, 3 and 5. The pivotal arm 41 does not present an obstacle to movement of the chain, since when the chain 22 moves in said direction the arm can be lifted readily to an inactive position by the chain links as they pass beneath the arm, the arm being held in light abutment with the links through the effect of gravity and by the force exerted by the spring 45.

Figure 5:
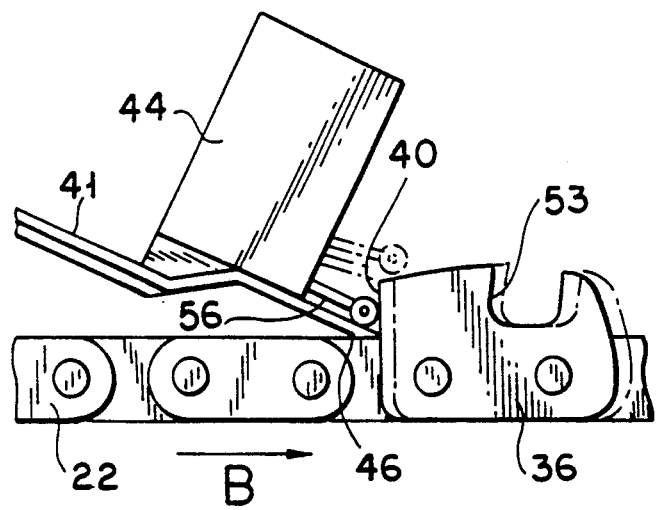
FIG 5 is a part view, in still larger scale, which illustrates the outer part of a pivotable arm serving as a movable stop means, and also illustrates a microswitch carried by said arm in engagement with the trailing edge of a cutter link.

Movement of the chain in the direction of the arrow B is continued until a chain cutter link 36 on the side of the chain concerned reaches a position corresponding to the position shown in chain lines in FIG. 5. As soon as this occurs, the pivotal arm 41 will fall down behind said link, from the position shown in chain lines in FIG. 5 to the position shown in full lines. As the arm falls, an actuator pin 56 on the microswitch 44 is pressed in by the trailing edge 40 of the link 36, whereupon a short signal is transmitted to the control unit 47 which causes the unit to reverse the direction of rotation of the motor 32 and the drive wheel 33. The motor 32 thus drives the chain 22 in the reverse direction until the cutter link 36 reaches the position shown in full lines in FIG. 5, in which the link abuts the outerpart 46 of the arm 41, which serves as a stop abutment, and again activates the microswitch 44 through the activating pin 56. When the cutter link 36 reaches this position, the reverse drive of the chain is disconnected by the friction clutch or coupling 35. Shortly thereafter, the motor 32 is also stopped, by a time control from the control unit 47.

The cutter link has now reached the grinding location. The control unit 47 will now activate the Bowden-cable 51 for manipulation of the eccentric cam 38 so that the link is clamped securely between the two guide rails 23 and 25, whereafter the Bowden-cable 52 is activated so as to swing down the grinding wheel 19 into grinding engagement with the cutting edge 53 of the link. When grinding of the edge is completed, the grinding wheel and the eccentric cam are returned to their starting positions, whereafter the motor 32 is again started up, in order to drive the chain in the direction of the arrow B and advance the next cutter link to be ground to the grinding location.

It will be understood that the invention is not limited to the aforedescribed and illustrated embodiment, and that alternative embodiments are conceivable within the concept of the invention. For example, the microswitch 44 may be replaced with some other suitable detecting means, e.g. an inductive transducer or metal detector. Instead of being laterally displaceable and provided with a single detecting means, the stop finger 46 may be made wider and provided with two mutually parallel detecting means 44 which inform the control unit 47 as to the type to cutter link that has passed or is passing by said detecting means, wherewith the control unit decides whether the cutter link shall be ground or whether the next cutter link shall be brought forward, depending upon the setting of the chain support 14.

Furthermore, instead of the described feed with the chain drive wheel 33, the pivotal arm 41 may be journalled on a plate (not shown) which is caused to move reciprocatingly along the carrier rail 24 of the chain support by a driving mechanism (also not shown), so that the pivotal arm 41 will function as an indexing finger which, by means of detecting means 44, detects cutter links which are to be ground and indexes said links forward, while being controlled by the control unit 47, to a terminal position of the reciprocatory movement of the arm 41, this terminal position defining the grinding location and bringing the chain feed movement to a stop. In this case the chain drive wheel 33 is replaced with a friction-braked chain wheel having a built-in spring mechanism which when movement ceases attempts to turn the wheel against the earlier direction of rotation, so as to hold the cutter link concerned in abutment with the indexing and stop finger 46. Subsequent to grinding the cutter link in the aforedescribed fashion, the chain feed movements are repeated until a new cutter link to be ground is positioned in the grinding location.

I claim:

1. An arrangement in an automatic saw chain grinder of the kind which includes a chain support (14), control means (47) and feed means (30) for indexing forward a row of right and left hand saw-chain cutter links (36) automatically and in a guided manner to a pre-determined grinding location on the chain support (14), and which further includes a grinding machine (18, 19) which is movably mounted in relation to the chain support and which is a first setting is arranged to grind right hand cutter links and in a second setting left hand cutter links and which is operative in grinding the cutting edge (53) of a cutter link (36) positioned in said grinding location while being guided automatically via the control means, and in which grinder said grinding location is defined by a chain feed and/or stop finger which moves between an active and an inactive position while detecting the contours of the chain links and against which the trailing edge (40) of a cutter link in the grinding location can be brought to bear when the finger is in its active position, this abutment being effected through said feed means (30), which includes an electric motor (32) and a rotating or indexing chain drive mechanism driven by said motor, characterized in that the arrangement comprises at least one chain feed and/or stop finger having mounted thereon at least one detecting means (44) which in dependance of the setting of the grinding machine is intended to detect when a right or left hand cutter link to be ground passes or has passed the finger (46) and therewith to cause the control means and feed means (30, 47) to bring the cutter link to the grinding location.

2. An arrangement according to claim 1, characterized in that the detecting means (44) in intended to be activated when the chain feed and/or stop finger (46) moves from its inactive to its active position.

3. An arrangement according to claim 1, characterized in that the detecting means is a microswitch.

4. An arrangement according to claim 1, characterized in that the detecting means is an inductive transducer.

5. An arrangement according to claim 1, characterized in that the detecting means is intended to be activated by the rear edge (40) of said cutter link (36).

6. An arrangement according to claim 1, characterized in that the control means (47) is operative in bringing a cutter link (36) to be ground to the grinding location in response to signals from the sensing device (44) on the chain feed and/or stop finger (46) and to activate clamping means (38) for holding the cutter link firmly while grinding the cutting edge (53) of said link.

* * * * *